US011731633B2

(12) United States Patent
Tulpule (10) Patent No.: US 11,731,633 B2
(45) Date of Patent: Aug. 22, 2023

(54) VEHICLE LOSS CALCULATION FOR IMPROVED FUEL ECONOMY

(71) Applicant: Cummins Inc., Columbus, IN (US)

(72) Inventor: Pinak Jayant Tulpule, Pune (IN)

(73) Assignee: Cummins Inc., Columbus, IN (US)

( * ) Notice: Subject to any disclaimer, the term of this patent is extended or adjusted under 35 U.S.C. 154(b) by 140 days.

(21) Appl. No.: 16/647,108

(22) PCT Filed: Sep. 14, 2018

(86) PCT No.: PCT/US2018/051147
§ 371 (c)(1),
(2) Date: Mar. 13, 2020

(87) PCT Pub. No.: WO2019/055826
PCT Pub. Date: Mar. 21, 2019

(65) Prior Publication Data
US 2020/0276974 A1    Sep. 3, 2020

Related U.S. Application Data

(60) Provisional application No. 62/558,944, filed on Sep. 15, 2017.

(51) Int. Cl.
*F02D 41/02* (2006.01)
*F02D 41/26* (2006.01)
(Continued)

(52) U.S. Cl.
CPC ......... *B60W 30/188* (2013.01); *F02D 41/021* (2013.01); *F02D 41/263* (2013.01); *G01C 21/3469* (2013.01); *B60W 2555/20* (2020.02)

(58) Field of Classification Search
CPC .. F02D 41/021; F02D 41/263; B60W 30/188; G06F 19/00; G01F 9/023; G01C 21/3469; G05D 1/0005; G06G 7/70; B60R 16/0236
See application file for complete search history.

(56) References Cited

U.S. PATENT DOCUMENTS

| | | |
|---|---|---|
| 8,452,509 B2 | 5/2013 | Sujan |
| 9,067,602 B2 | 6/2015 | Baek |

(Continued)

FOREIGN PATENT DOCUMENTS

| | | |
|---|---|---|
| WO | 2014149042 A1 | 9/2014 |
| WO | 2014149043 A1 | 9/2014 |

(Continued)

OTHER PUBLICATIONS

International Search Report and Written Opinion issued by the ISA/US, Commissioner for Patents, dated Dec. 10, 2018, for International Application No. PCT/US2018/051147; 8 pages.

(Continued)

*Primary Examiner* — John Kwon
*Assistant Examiner* — Johnny H Hoang
(74) *Attorney, Agent, or Firm* — Faegre Drinker Biddle & Reath LLP (57) ABSTRACT

A method of operating a vehicle, comprising: receiving ambient air information; receiving size, distance and relative velocity information about a vehicle in proximity to the vehicle; receiving road surface properties information; receiving wind velocity and direction information; computing an air density ratio factor using the ambient air information; computing an aerodynamic drag ratio factor using the size, distance and relative velocity information; computing a rolling resistance ratio factor using the information road surface properties information; computing effective velocity of the vehicle using the wind velocity and direction information; combining at least one of the air density ratio factor, the aerodynamic drag ratio factor and the rolling resistance ratio factor with vehicle loss coefficients to determining new vehicle loss coefficients; computing an energy loss or power loss of the vehicle using the new vehicle loss (Continued)

coefficients and the effective velocity of the vehicle; and controlling the vehicle to improve fuel economy.

20 Claims, 5 Drawing Sheets

(51) Int. Cl.
*B60W 30/18* (2012.01)
*G01C 21/34* (2006.01)
*B60W 30/188* (2012.01)

(56) References Cited

U.S. PATENT DOCUMENTS

| | | | |
|---|---|---|---|
| 10,231,187 B1* | 3/2019 | Rubin | G08G 1/096791 |
| 11,030,764 B2* | 6/2021 | Lai | G06V 10/50 |
| 2007/0112475 A1* | 5/2007 | Koebler | B60L 3/12 |
| | | | 701/1 |
| 2008/0154629 A1 | 6/2008 | Breed et al. | |
| 2008/0216567 A1 | 9/2008 | Breed et al. | |
| 2010/0101306 A1* | 4/2010 | Suematsu | H01M 8/0662 |
| | | | 73/40.7 |
| 2011/0313647 A1 | 12/2011 | Koebler et al. | |
| 2015/0375837 A1* | 12/2015 | Johnson | B63B 39/00 |
| | | | 701/21 |
| 2016/0059851 A1* | 3/2016 | Klier | B60W 40/068 |
| | | | 701/70 |
| 2017/0176192 A1* | 6/2017 | Cardoso de Moura | |
| | | | G01C 21/3461 |
| 2017/0199527 A1* | 7/2017 | Chandra | G05D 1/0011 |
| 2017/0203309 A1* | 7/2017 | Krueger | A01M 7/006 |
| 2020/0180653 A1* | 6/2020 | Chi | B60W 50/029 |

FOREIGN PATENT DOCUMENTS

| | | |
|---|---|---|
| WO | 2014149044 A1 | 9/2014 |
| WO | 2016013996 A1 | 1/2016 |

OTHER PUBLICATIONS

International Preliminary Report on Patentability received for PCT Patent Application No. PCT/US2018/051147, dated Mar. 26, 2020, 8 pages.

\* cited by examiner

VEHICLE LOSS CALCULATION FOR IMPROVED FUEL ECONOMY

CROSS-REFERENCE TO RELATED APPLICATIONS

The present application is a National Stage filing of International Application No. PCT/US2018/051147, filed Sep. 14, 2018, which claims priority to Provisional Application Ser. 62/558,944, filed on Sep. 15, 2017, the entire disclosures of which are hereby expressly incorporated herein by reference.

FIELD OF THE DISCLOSURE

The present disclosure generally relates to methods and systems for determining vehicle losses, and more particularly to method and systems using advanced sensors and external information to predict vehicle losses to permit improved fuel economy.

BACKGROUND OF THE DISCLOSURE

The power required to propel a vehicle varies substantially in response to a variety of factors, many of which are external to the vehicle. If the influencing factors can be determined in real time or even predicted, then the performance of the engine and the powertrain may be controlled to maintain drivability while improving fuel economy. Conventional systems either use static, calibrated values for vehicle loss parameters or estimate losses in response to changes in operating conditions, not in anticipation of such changes. Accordingly, an improved approach to vehicle loss determination is needed.

SUMMARY

In one embodiment of the present disclosure, a method of operating a vehicle is provided, comprising: receiving ambient air information; receiving size, distance to and relative velocity information about at least one vehicle in proximity to the vehicle; receiving road surface properties information; receiving wind velocity and direction information; computing an air density ratio factor using the ambient air information; computing an aerodynamic drag ratio factor using the size, distance and relative velocity information; computing a rolling resistance ratio factor using the road surface properties information; computing an effective velocity of the vehicle using the wind velocity and direction information; combining at least one of the air density ratio factor, the aerodynamic drag ratio factor and the rolling resistance ratio factor with vehicle loss coefficients to determining new vehicle loss coefficients; computing at least one of energy loss or power loss of the vehicle using the new vehicle loss coefficients and the effective velocity of the vehicle; and using the computed at least one of energy loss or power loss to control the vehicle to improve a fuel economy of the vehicle. In one aspect of this embodiment, the ambient air information includes information about air temperature, air pressure and air humidity. In another aspect, receiving ambient air information includes receiving air temperature information from a temperature sensor on the vehicle, receiving air pressure information from a pressure sensor on the vehicle, and receiving air humidity information from a humidity sensor on the vehicle. In another aspect, receiving size, distance and relative velocity information includes receiving information from a proximity sensor on the vehicle. In yet another aspect, the road surface properties information includes information about road wetness. Still another aspect of this embodiment further comprises predicting at least one of motion of the vehicle relative to another vehicle, roadway conditions or weather conditions.

In another embodiment, the present disclosure provides a method of operating a vehicle, comprising: receiving ambient air information; receiving size, distance to and relative velocity information about at least one vehicle in proximity to the vehicle; receiving road surface properties information; receiving wind velocity and direction information; computing an air density variable using the ambient air information; computing an aerodynamic drag variable using the size, distance and relative velocity information; computing at least one of a static rolling resistance variable and a dynamic rolling resistance variable using the road surface properties information; computing effective velocity of the vehicle using the wind velocity and direction information; receiving road terrain property information; computing at least one of energy loss or power loss of a powertrain of the vehicle; computing vehicle propulsion power using at least one of the air density variable, the aerodynamic drag variable, the static and dynamic rolling resistance variables, the effective velocity, the road terrain property information, and the computed powertrain loss; and using the computed at least one of energy loss or power loss to control the powertrain of the vehicle to improve a fuel economy of the vehicle. In one aspect of this embodiment, computing vehicle propulsion power includes determining the sum of the aerodynamic drag variable, a wheel drag variable determined using the static rolling resistance variable, the dynamic rolling resistance variable, a road grade variable and the effective velocity, a gravity factor, and a post-engine powertrain loss factor. Another aspect of this embodiment further comprises predicting at least one of motion of the vehicle relative to another vehicle, roadway conditions or weather conditions. In another aspect, the ambient air information includes information about air temperature, air pressure and air humidity. In another aspect, receiving ambient air information includes receiving air temperature information from a temperature sensor on the vehicle, receiving air pressure information from a pressure sensor on the vehicle, and receiving air humidity information from a humidity sensor on the vehicle. In yet another aspect, receiving size, distance and relative velocity information includes receiving information from a proximity sensor on the vehicle. In still another aspect of this embodiment, the road surface properties information includes road wetness information. In another aspect, the road terrain property information includes information about road grade.

In yet another embodiment, the present disclosure provides a system for operating a vehicle to enhance fuel economy, comprising: a vehicle; a temperature sensor configured to provide an ambient air temperature output signal; a pressure sensor configured to provide an air pressure output signal; a humidity sensor configured to provide an air humidity output signal; at least one proximity sensor configured to provide a proximity output signal including information about a size, distance to and relative velocity of at least one vehicle in proximity to the vehicle; a wind sensor configured to provide a wind output signal including information about a velocity and direction of wind in proximity to the vehicle; a road surface properties data source configured to provide road surface properties information; a powertrain configured to power movement of the vehicle; and an engine control module configured to: compute an air density ratio factor using the ambient air temperature output signal, the air pressure output signal and the air humidity signal; compute an aerodynamic drag ratio factor using the proximity output signal; compute a rolling resistance ratio factor using the road surface properties information; compute an effective velocity of the vehicle using the wind output signal; combine at least one of the air density ratio factor, the aerodynamic drag ratio factor and the rolling resistance ratio factor with vehicle loss coefficients to determining new vehicle loss coefficients; compute at least one of energy loss or power loss of the vehicle using the new vehicle loss coefficients and the effective velocity of the vehicle; and control the powertrain to improve fuel economy of the vehicle using the computed at least one of energy loss or power loss. In one aspect of this embodiment, the road surface properties information includes information about road wetness. In another aspect, the engine control module is further configured to predict at least one of motion of the vehicle relative to another vehicle, roadway conditions or weather conditions. In another aspect, the engine control module is further configured to compute vehicle propulsion power by determining the sum of an aerodynamic drag variable, a wheel drag variable determined using a static rolling resistance variable, a dynamic rolling resistance variable, a road grade variable and the effective velocity, a gravity factor, and a post-engine powertrain loss factor. In a variant of this aspect, the engine control module computes vehicle propulsion power using received road terrain property information including information about road grade. In yet another aspect of this embodiment, the temperature sensor, the pressure sensor, the humidity sensor, the at least one proximity sensor and the wind sensor are mounted to the vehicle, and the road surface properties data source is communicatively coupled to the engine control module over a network.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

Fuel economy improvements may be achieved using Data Enabled Technology ("DET"), which includes the use of various information to provide "beyond the flywheel" fuel economy improvements. In general, DET may affect vehicle systems to cause vehicle drivers to operate more like the best vehicle drivers, to make the best use of the vehicle powertrain, and to manage the tradeoff between fuel economy and performance. As explained herein, the present disclosure permits accurate computation of vehicle losses based on advanced sensors. This permits estimation of the best speed for the vehicle and/or when to shift or coast. Control over these parameters permits improved fuel economy while maintaining acceptable performance. For example, the vehicle Engine Control Module ("ECM") could use information gathered and processed according to the principles of the present disclosure to place controls on the vehicle speed to maintain a desired engine economy performance.

The information leveraged in DET includes internal information, external static information and external dynamic information. The internal information may include information about components of the vehicle and information about the vehicle's immediate surroundings that changes with time and is only available substantially instantaneously. This information may be available from on-board sensors and through communication with the vehicle's powertrain components. Examples of such internal information include engine speed, vehicle speed, temperature, humidity, current road grade, etc. All of these parameters are highly variable with time.

External static information may include information about parameters external to the vehicle that remain constant or change slowly over time (e.g., daily, weekly, etc.). This external static information may be obtained from map based data and/or communication with devices outside the vehicle or vehicle-to-external object ("V2X") communications using a communications network. Examples of such external static information include road grade, intersection information, road curvature, vehicle charging locations, construction site locations, etc.

External dynamic information may include information about parameters external to the vehicle that change frequently over time. Such information may be obtained using V2X communication, such as vehicle-to-vehicle communication, using a communications network. Examples of such external dynamic information include traffic density, weather forecasts (including wind speed and precipitation), traffic light phases, road conditions, current fuel/electricity prices, etc.

By using the above-described information, a system according to the present disclosure accurately predicts vehicle losses to determine how best to control vehicle/engine parameters such as vehicle speed, engine torque, vehicle coasting, acceleration, etc. to improve fuel economy. Vehicle loss models may be used to estimate engine power by estimating coefficients of the model and determining when the coefficients converge (or come within a threshold of the actual engine power). This approach is described in detail in U.S. Publication No. 2017/0174216, entitled "VEHICLE CONTROLS INCLUDING DYNAMIC VEHICLE PARAMETER DETERMINATION," filed Dec. 21, 2015 ("the '216 publication"), the entire disclosure of which being hereby expressly incorporated herein by reference. According to this approach, however, there may be delays in the availability of new vehicle losses after a change is detected. The present disclosure, on the other hand, provides vehicle losses directly based on vehicle motion and advanced sensors. This may have particular significance in the context of multi-vehicle controls such as platooning, where it is important to know vehicle losses in real time, as they change dynamically as a result of movement of the vehicle relative to other vehicles or objects on the road. For example, vehicle losses are significantly different when a vehicle is drafting another vehicle, as compared to when the vehicles are in adjacent lanes. The ability to rapidly identify those loss differences is useful in improving vehicle drivability and fuel economy. The methods of the present disclosure also take into account rolling resistance, which is important in low speed applications and dependent upon weather conditions.

As explained in the '216 publication, a vehicle loss model may correlate total vehicle power loss as a dependent variable with vehicle speed as an independent variable. The model may be structured as a polynomial as represented by equation (1) below, including coefficients $a_0, a_1, a_2, \ldots a_n$ and vehicle velocity u.

$$a_0 + a_1 \cdot u + a_2 \cdot u^2 + \ldots + a_n \cdot u^n; \ n \geq 2. \tag{1}$$

This polynomial represents a loss power estimation, which may also be represented as follows:
Loss Power Estimation:

$$\underline{P_{eng\ out} - P_{Gravity} - P_{Accl}} = \underline{P_{Aero} + P_{Whl\ drag} + P_{Loss}} \tag{2}$$

In equation (2), the total vehicle power loss is represented by the right side of the equation, taking into account losses due to aerodynamic drag, wheel drag and post-engine powertrain losses.

The present disclosure permits determination of changes to (or absolute values of) $a_i$, coefficients based on advanced sensors (internal information) and external static and dynamic information. As indicated above, the information used may include the proximity of other vehicles including a front vehicle, the size and shape of surrounding vehicles, the relative velocity of surrounding vehicles, weather information such as rain, snow, and sun light, wind speed and direction, relative humidity, air temperature, air density, road surface information (e.g., amount of ice and/or water on the road), tire pressure, etc.

Many parameters affect power losses of a vehicle, and consequently fuel economy. For example, it is well known that aerodynamic drag significantly affects fuel consumption. When a trail vehicle drafts behind a lead vehicle, particularly by a distance roughly equivalent to one vehicle length, the aerodynamic drag on the trail vehicle is substantially reduced. The present disclosure proposes the use of proximity sensors (e.g., radar, lidar, IR, cameras, etc.) to detect the size and shape of surrounding vehicles as well as the distance between the vehicles. This information is used to determine the change in aerodynamic drag to the vehicle being controlled. In this manner, the vehicle ECM may control various powertrain components to improve fuel economy quickly in reaction to relative movements of the vehicles.

Wind is another significant factor in fuel economy. It is well-known that, ignoring all other factors in determining a vehicle's velocity except wind, the vehicle velocity is equal to the velocity of the vehicle without any wind plus the product of the wind velocity and $\cos(\theta)$, where $\theta$ is the angle between the vehicle's motion and the direction of the wind. In various embodiments, wind speed and direction may be obtained by the present system through use of on-board sensors or through V2X communication.

Air density also affects the fuel economy of a vehicle. The more dense the air, the more fuel is required to power the vehicle through the air at a particular speed. Air density is affected by the humidity, temperature and pressure of the air. As shown in equation (3) below, it is known that $$\rho = \frac{p}{R_{specific} T} \tag{3}$$

where $\rho$ is air density (kg/m$^3$), p is absolute pressure (Pa), T is absolute temperature (K) and $R_{specific}$ is the specific gas constant for dry air (J/(kg*K)). The equation for humid air is shown in equation (4) below.

$$\rho_{humid\ air} = \frac{p_d}{R_d T} + \frac{p_v}{R_v T} = \frac{p_d M_d + p_v M_v}{RT} \tag{4}$$

where $\rho_{humid\ air}$ is the density of humid air (kg/m$^3$), $p_d$ is the partial pressure of dry air (Pa), $R_d$ is the specific gas constant for dry air (287.058 J/(kg*K)), T is absolute temperature (K), $p_e$ is the pressure of water vapor (Pa), $R_e$ is the specific gas constant for water vapor (461.495 J/(Kg*K)), $M_d$ is the molar mass of dry air (0.028964 kg/mol), R is the universal gas constant (8.314 J/(K*mol)), and $p_v$ is the vapor pressure of water (i.e., the product of the relative humidity and the saturation vapor pressure). Humidity, temperature and pressure may be obtained using on-board sensors and/or using V2X communication.

Rolling resistance is another factor that affects fuel economy. For example, rolling resistance decreases as temperature increases, thereby increasing fuel economy. Rolling resistance is affected by ambient temperature, road surface temperature and tire temperature, as well as road wetness. Information regarding these parameters may be obtained by ECM using on-board sensors or V2X communications.

Figure 1:
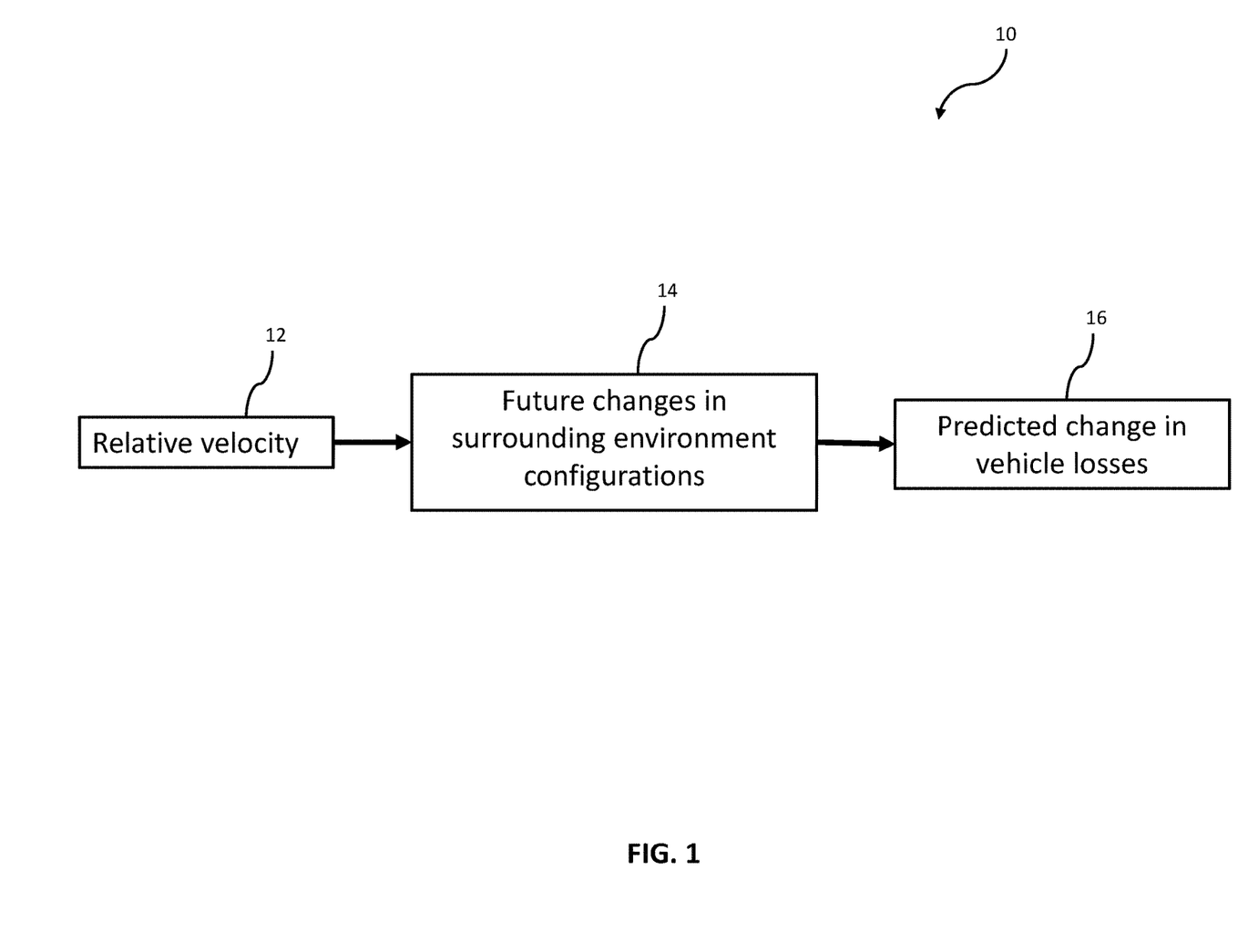
FIG. 1 is a simplified block diagram of a method according to the present disclosure.

In a very basic form, a method according to the present disclosure may be depicted as shown in FIG. 1. In the example of FIG. 1, changes in vehicle losses are predicted using the information sources described above. More specifically, the relative velocity of vehicles around the controlled vehicle (i.e., traffic) and the existence of a tunnel or bridge (both influencing the effects of wind on aerodynamic drag) and other information are used to predict the changes in vehicle loss coefficients due to changes in drag coefficient over a specific look-ahead distance or time. In the method 10, the relative velocity of the vehicles is determined using on-board sensors or V2X communications at step 12. The ECM obtains information (internal and/or external) about parameters that may affect vehicle losses during the specified time period or distance at step 14. At step 16, the ECM determines the predicted changes in vehicle losses during the specified time period or distance based on the information obtained in step 14.

Figure 2:
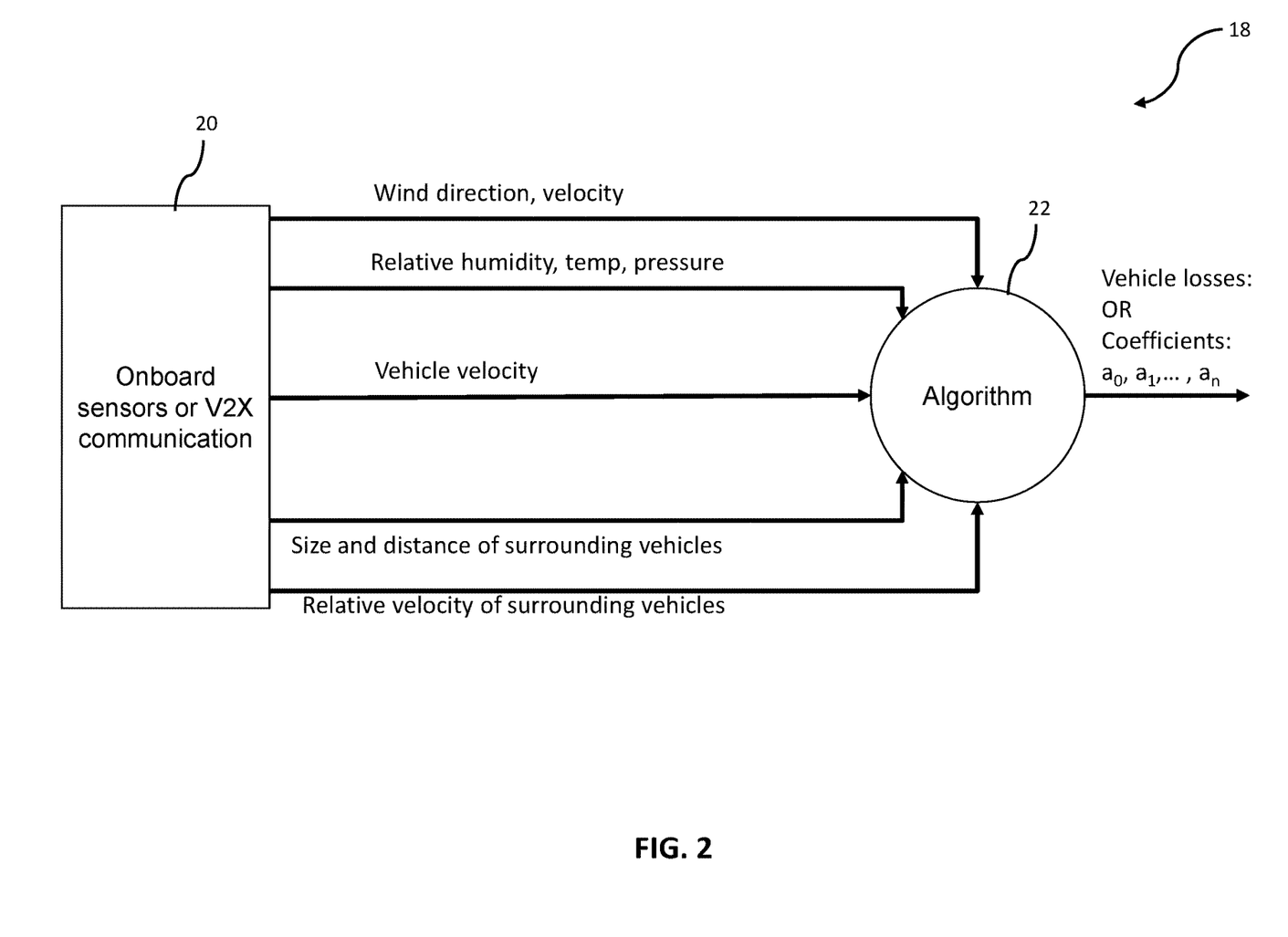
FIG. 2 is a simplified block diagram of another method according to the present disclosure.

Referring now to FIG. 2, a conceptual functional diagram of a system of the present disclosure is shown. In system 18, information that may affect fuel economy is collected from any and/or all of the above-described sources at block 20. In the example shown, the information may include one or more of wind direction, wind velocity, relative air humidity, air temperature, air pressure, vehicle velocity, size and distance of surrounding vehicles, and relative velocity of surrounding vehicles. Block 22 represents an algorithm (as is further described herein as being performed by the vehicle ECM) that uses the information collected at block 20 to determine absolute vehicle losses (including aerodynamic losses, rolling resistance losses, friction losses, etc.). In an alternative embodiment, the algorithm may determine a change in the coefficients calculated in the manner described in the '216 publication.

Figure 3:
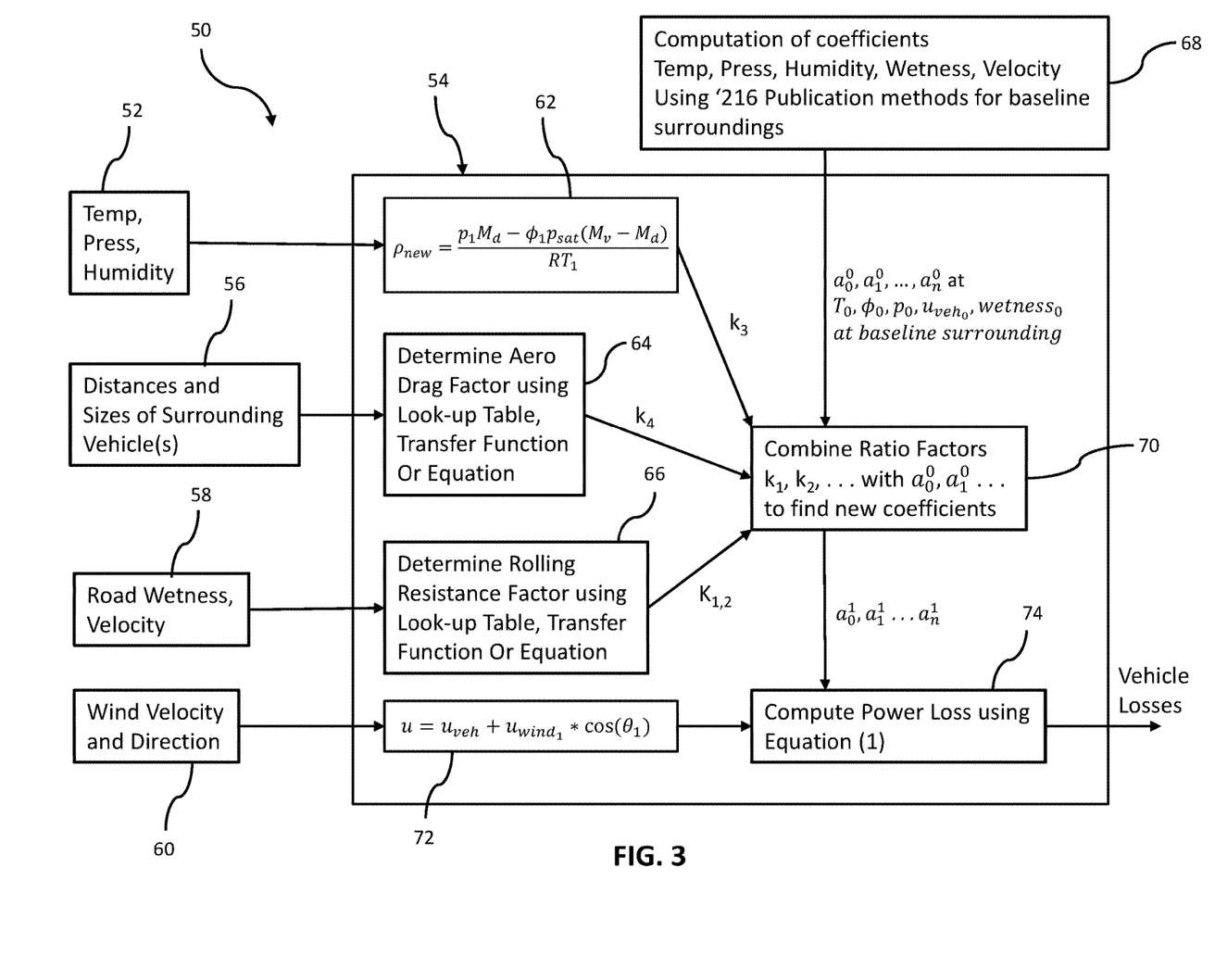
FIG. 3 is a block diagram of a method of computing vehicle losses according to one embodiment of the present disclosure.

Referring now to FIG. 3, a first example of a vehicle loss system 50 is shown. In system 50, air temperature ($T_1$), absolute air pressure ($p_1$) and relative air humidity ($\phi_1$) are measured by appropriate on-board sensors (represented by block 52) or otherwise read by ECM 54 using V2X communications. Block 56 represents on-board proximity sensors (e.g., radar, lidar, IR, cameras, etc.) for determining the size and relative distance of surrounding vehicles. The sensors of block 56 may be on the controlled vehicle and/or on the surrounding vehicles. As indicated above, this information, particularly information about the size and location of the front vehicle, permits ECM 54 to account for aerodynamic drag effects. Additional on-board sensors or data sources accessible using V2X communications are represent by block 58 and provide information about road wetness, which affects the rolling resistance of the vehicle as indicated above. Finally, block 60 represents one or more on-board sensor or accessible data source for providing current wind speed and direction.

ECM 54 receives information from the sensors/sources represented by blocks 52, 56, 58 and 60 and uses the information to compute vehicle losses in the manner described below. ECM 54 processes data from sensors/sources 52 according to processing block 62 to determine an air density ratio factor $k_3$, where $$k_3 = \frac{a_3^0(T_0, \rho_0, \phi_0)}{a_3^1(T_1, \rho_1, \phi_1)}.$$

ECM 54 processes data from sensors/sources 56 using a look-up table, transfer function or equation as represented by processing block 64 to compute an aerodynamic drag ratio factor $k_4$, where $$k_4 = \frac{a_3^0(\text{Baseline surrounding})}{a_3^1(\text{new surrounding})}.$$

Similarly, ECM 54 processes data from sensors/sources 58 using a look-up table, transfer function or equation as represented by processing block 66 to compute a rolling resistance ratio factor $k_{1,2}$, where $$k_{1,2} = \frac{a_{1,2}^0(u_{veh_0}, wetness_0)}{a_{1,2}^1(u_{veh_1}, wetness_1)}.$$

In this embodiment, inputs from sensors/sources 52, 56 and 58 are also processed according to the principles of the '216 publication at block 68 to determine vehicle loss coefficients $a_0^0, a_1^0 \ldots$ under baseline surroundings. At processing block 70, ECM 54 combines ratio factors k1, k2, k3 and k4 with the loss coefficients $a_0^0, a_1^0 \ldots$ from block 68 to find the new coefficients $a_0^1, a_1^1 \ldots a_n^1$.

Wind velocity and direction information from sensors/sources 60 is processed by ECM 54 at processing block 72 to determine the impact on the relative velocity of the vehicle in the manner described above. Finally, at processing block 74 ECM 54 computes vehicle losses using Equation (1) above.

Figure 4:
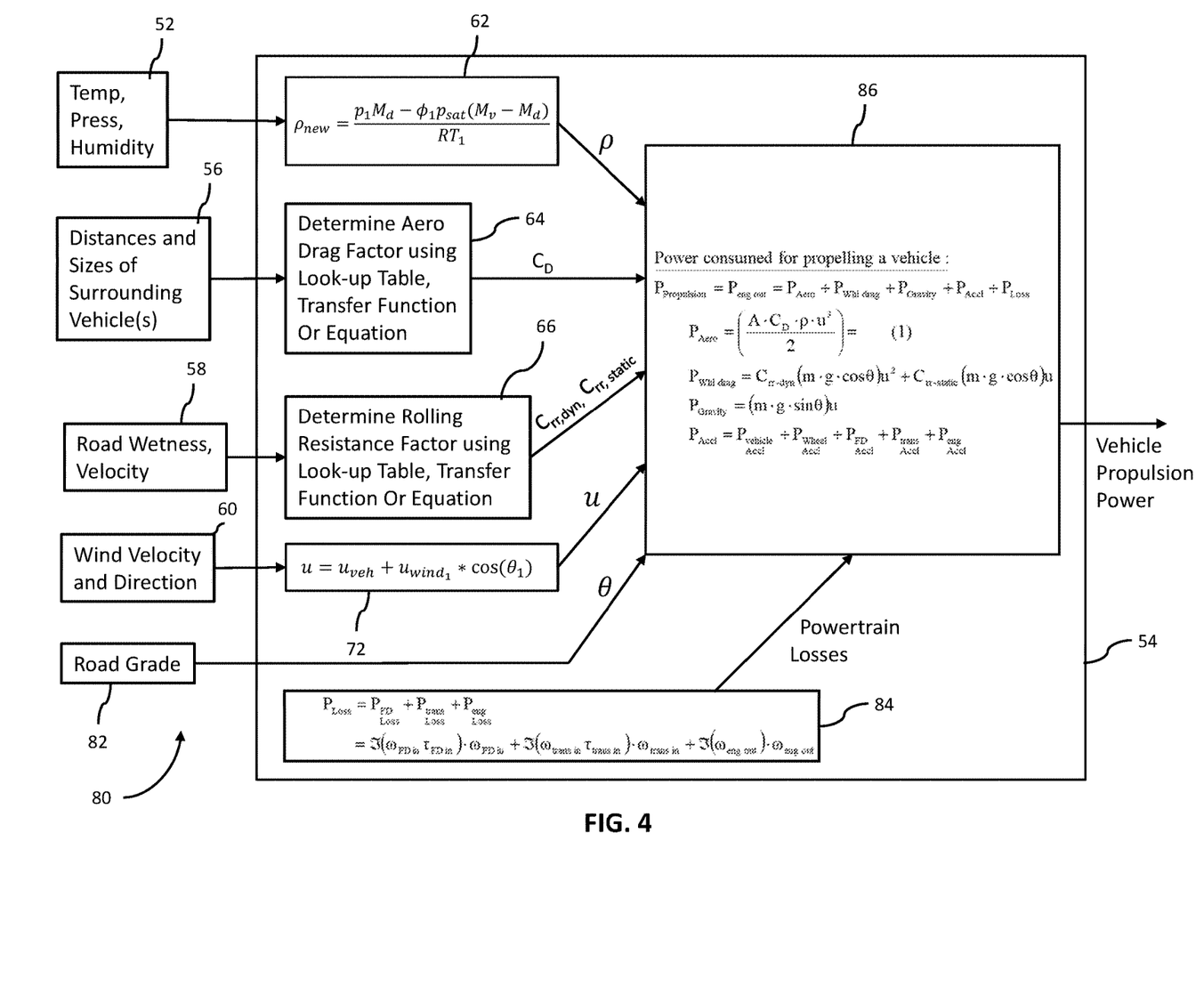
FIG. 4 is a block diagram of a method of computing vehicle propulsion power according to another embodiment of the present disclosure.

FIG. 4 depicts another embodiment of a system 80 according to the present disclosure. System 80 determines vehicle propulsion power as described below. Blocks 52, 56, 58 and 60 are identical to those described with reference to FIG. 3. At processing block 62, ECM 54 determines air density p according to the equation in processing block 62. At processing block 64, ECM 54 determines aerodynamic drag variable $C_D$ using a look-up table, a transfer function or an equation. At processing block 66, ECM 54 determines static and dynamic rolling resistance variables $C_{rr,dyn}$, $C_{rr, static}$ using a look-up table, a transfer function or an equation. At processing block 72, ECM 54 determines the relative velocity of the vehicle, u, using the equation listed in block 72.

In the embodiment of FIG. 4, road grade information is sensed such as by an appropriate on-board sensor or accessible by ECM 54 from a storage location (either on-board or accessible using V2X communications) (all represented at block 82). The current road grade is represented by the variable $\Theta$. At processing block 84, ECM 54 calculates powertrain losses using map-based look-up tables or curve fitting techniques to estimate the losses. The results of all of processing blocks 62, 64, 66, 72 and 84 as well as current road grade information are processed at processing block 86.

In system 50, air temperature ($T_1$), absolute air pressure ($p_1$) and relative air humidity ($\phi_1$) are measured by appropriate on-board sensors (represented by block 52) or otherwise read by ECM 54 using V2X communications.

At processing block 86, ECM 54 determines the power consumed to propel the vehicle using the equation $P_{propulsion} = P_{eng\ out} = P_{Aero} + P_{Whl\ drag} + P_{Gravity} + P_{Accl} + P_{Loss}$. As shown in processing block 86, the factor $P_{Aero}$ uses the variables $\rho$, $C_D$ and u as calculated in the manner described above. $P_{Whldrag}$ uses the static and dynamic rolling resistance variables discussed above, as well as the road grade variable $\Theta$ and relative velocity u. The factor $P_{Gravity}$ also uses $\Theta$ and u. The factor $P_{Accl}$ takes into account several factors of power consumption as shown which may be broken down into the following equation:

$$P_{Accl} = (m \cdot a)u(I_{whl}\dot{\omega}_{whl})\omega_{whl} + (I_{FD}\dot{\omega}_{FD})\omega_{FD} +$$
$$(I_{trans}\dot{\omega}_{trans})\omega_{trans} + (I_{eng}\dot{\omega}_{eng})\omega_{eng}$$
$$= (m \cdot a)u + (M_{eqv} \cdot a)u.$$

ECM 54 processes the information and solves for $P_{propulsion}$ which is output and may be used in controlling the vehicle's performance (e.g., speed, shifting, coasting, etc.) to increase fuel economy.

Figure 5:
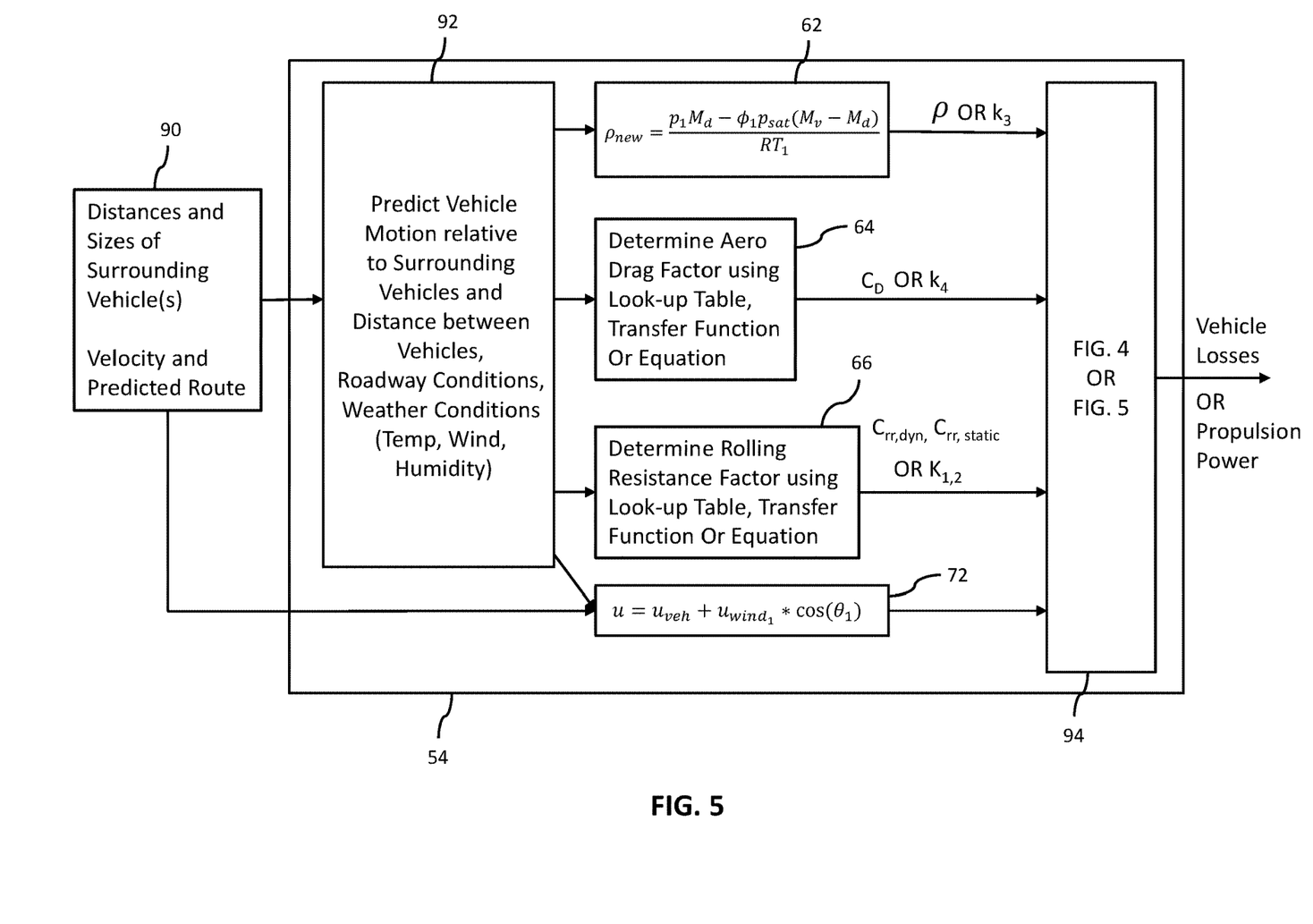
FIG. 5 is an expanded block diagram of the method depicted in FIG. 1.

Referring now to FIG. 5, the process 10 of FIG. 1 is provided in expanded form. As shown, at block 90 the distances and sizes of vehicles surrounding the controlled vehicle are measured by sensors as described above. This information, along with the relative velocity and predicted route of the controlled vehicle is provided to processing block 92 of ECM 54. At block 92, ECM 54 predicts the motion of the vehicle relative to surrounding vehicles and predicts the distance between the vehicles. ECM 54 also predicts roadway conditions and weather conditions (e.g., temperature, wind, humidity, etc.) at block 92. For example, if the vehicle is predicted to begin drafting (getting closer to the front vehicle), then the predicted aerodynamic drag will be reduced. If the vehicle is predicted to travel into a dense forest, then the effect of wind on the vehicle will be reduced.

Also, if the vehicle is predicted to travel over a bridge, then the predicted rolling resistance will be impacted.

Processing blocks 62, 64, 66 and 72 are the same as those described above with reference to FIGS. 3 and 4. The output of processing block 62 is either air density, ρ, as explained above with reference to FIG. 5 or $k_3$ as explained above with reference to FIG. 3. Similarly, the output of processing block 64 is either $C_D$ as explained above with reference to FIG. 5 or $k_4$ as explained above with reference to FIG. 3. Likewise, the output of processing block 66 is either $C_{rr,dyn}$, $C_{rr, static}$ as explained above with reference to FIG. 4 or $k_{1,2}$ as explained above with reference to FIG. 3. The output of processing block 72 is the relative velocity of the vehicle as explained above with reference to FIGS. 3 and 4.

The predicted change in vehicle losses is then determined by ECM 54 using either the approach of FIG. 3 or the approach of FIG. 4 at processing block 94. In other words, if the approach of FIG. 3 is used the ratio factors $k_{1,2}$, $k_3$ and $k_4$ are determined in processing blocks 66, 62 and 64, respectively, and provided to processing block 70 of FIG. 3 where the factors are combined with the loss coefficients output by a system according to the '216 publication (block 68). Then, the new coefficients output by block 70 are used, along with the relative velocity of block 72 to compute vehicle losses as described above with reference to FIG. 3.

Alternatively, if the approach of FIG. 4 is employed to compute propulsion power, the outputs of processing blocks 62, 64 and 66 are ρ, $C_D$, and $C_{rr,dyn}$, $C_{rr, static}$, respectively, which are provided to processing block 86 of FIG. 4 along with relative velocity from block 72, grade information from block 82 and computed powertrain losses from block 84. These inputs are processed in the manner discussed above to a provide vehicle propulsion power output.

Using the teachings of the present disclosure, requirements for new sensor technology may be established to provide desired fuel efficiency benefits. The embodiments of the present disclosure permit improved estimation capability for vehicle losses in various traffic conditions, road conditions, weather conditions and applications. This permits the development of improved accuracy DET algorithms to control the vehicle's powertrain for improved fuel economy, drivability and performance. Advance Drive Assistance System ("ADAS") algorithms may also be improved.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating a vehicle, comprising:
receiving ambient air information;
receiving size, distance to and relative velocity (u) information about at least one vehicle in proximity to the vehicle;
receiving road surface properties information, including road grade angle (θ);
receiving wind velocity and direction information;
computing an air density ratio factor using the ambient air information;
computing an aerodynamic drag ratio factor ($C_D$) using the size, distance and relative velocity information;
computing a rolling resistance ratio factor using the road surface properties information;
computing an effective velocity of the vehicle using the wind velocity and direction information;
combining at least one of the air density ratio factor, the aerodynamic drag ratio factor and the rolling resistance ratio factor with vehicle loss coefficients to determine new vehicle loss coefficients;
computing power loss of the vehicle using the new vehicle loss coefficients and the effective velocity of the vehicle in an equation $P_{eng\ out} - P_{Gravity} - P_{Accl} = P_{Aero} + P_{Whl\ Drag} + P_{loss}$;
wherein $P_{eng\ out}$ is the power loss due to the energy output,
$P_{Gravity}$ is the power loss due to gravity calculated by the equation $P_{Gravity} = (m \cdot g \cdot \sin \theta)u$, $P_{Accl}$ is the power loss due to acceleration of the vehicle calculated by the equation $$P_{Accl} = (m \cdot a)u(I_{whl}\omega_{whl})\omega_{whl} + (I_{FD}\omega_{FD})\omega_{FD} +$$

$$(I_{trans}\omega_{trans})\omega_{trans} + (I_{eng}\omega_{eng})\omega_{eng} = (m \cdot a)u + (M_{eqv} \cdot a)u,$$

$P_{Aero}$ is power loss due to aerodynamic drag calculated by the equation $$P_{Aero} = \left(\frac{A \cdot C_D \cdot \rho \cdot u^3}{2}\right),$$

$P_{Whl\ Drag}$ is power loss due to wheel drag calculated by the equation $$P_{Whldrag} = C_{rr\text{-}dyn}(m \cdot g \cdot \cos\theta)u^2 + C_{rr\text{-}static}(m \cdot g \cdot \cos\theta)u,$$

and $P_{loss}$ is post-engine powertrain losses; and using the computed power loss to control the vehicle to improve a fuel economy of the vehicle.

2. The method of claim 1, wherein the ambient air information includes information about air temperature, air pressure and air humidity.

3. The method of claim 1, wherein receiving ambient air information includes receiving air temperature information from a temperature sensor on the vehicle, receiving air pressure information from a pressure sensor on the vehicle, and receiving air humidity information from a humidity sensor on the vehicle.

4. The method of claim 1, wherein receiving size, distance and relative velocity information includes receiving information from a proximity sensor on the vehicle.

5. The method of claim 1, wherein the road surface properties information includes information about road wetness.

6. The method of claim 1, further comprising predicting at least one of motion of the vehicle relative to another vehicle, roadway conditions or weather conditions over a specific look-ahead distance and time.

7. A method of operating a vehicle, comprising:
receiving ambient air information;
receiving size, distance to and relative velocity information about at least one vehicle in proximity to the vehicle;
receiving road surface properties information;
receiving wind velocity and direction information;
computing an air density variable using the ambient air information;
computing an aerodynamic drag variable using the size, distance and relative velocity information;
computing at least one of a static rolling resistance variable and a dynamic rolling resistance variable using the road surface properties information;
computing effective velocity of the vehicle using the wind velocity and direction information;
receiving road terrain property information;
computing power loss of a powertrain of the vehicle;
computing vehicle propulsion power using at least one of the air density variable, the aerodynamic drag variable, the static and dynamic rolling resistance variables, the effective velocity, the road terrain property information, and the computed powertrain loss in an equation $P_{propulsion} = P_{eng\ out} = P_{Aero} + P_{Whl\ Drag} + P_{loss}$;

wherein $P_{propulsion}$ is the power consumed to propel the vehicle, $P_{eng\ out}$ is the power loss due to the energy output, $P_{Gravity}$ is the power loss due to gravity calculated by the equation $P_{Gravity} = (m \cdot g \cdot \sin\theta)u$, $P_{Accl}$ is the power loss due to acceleration of the vehicle calculated by the equation $$P_{Accl} = (m \cdot a)u(I_{whl}\omega_{whl})\omega_{whl} + (I_{FD}\omega_{FD})\omega_{FD} +$$

$$(I_{trans}\omega_{trans})\omega_{trans} + (I_{eng}\omega_{eng})\omega_{eng} = (m \cdot a)u + (M_{eqv} \cdot a)u,$$

$P_{Aero}$ is power loss due to aerodynamic drag calculated by the equation $$P_{Aero} = \left(\frac{A \cdot C_D \cdot \rho \cdot u^3}{2}\right),$$

$P_{Whl\ Drag}$ is power loss due to wheel drag calculated by the equation $P_{Whldrag} = C_{rr\text{-}dyn}(m \cdot g \cdot \cos\theta)u^2 + C_{rr\text{-}static}(m \cdot g \cdot \cos\theta)u$, and $P_{loss}$ is post-engine powertrain losses; and using the computed power loss to control the powertrain of the vehicle to improve a fuel economy of the vehicle.

8. The method of claim 7, wherein computing vehicle propulsion power includes determining the sum of the aerodynamic drag variable, a wheel drag variable determined using the static rolling resistance variable, the dynamic rolling resistance variable, a road grade variable and the effective velocity, a gravity factor, and a post-engine powertrain loss factor.

9. The method of claim 7, further comprising predicting at least one of motion of the vehicle relative to another vehicle, roadway conditions or weather conditions.

10. The method of claim 7, wherein the ambient air information includes information about air temperature, air pressure and air humidity.

11. The method of claim 7, wherein receiving ambient air information includes receiving air temperature information from a temperature sensor on the vehicle, receiving air pressure information from a pressure sensor on the vehicle, and receiving air humidity information from a humidity sensor on the vehicle.

12. The method of claim 7, wherein receiving size, distance and relative velocity information includes receiving information from a proximity sensor on the vehicle.

13. The method of claim 7, wherein the road surface properties information includes road wetness information.

14. The method of claim 7, wherein the road terrain property information includes information about road grade.

15. A system for operating a vehicle to enhance fuel economy, comprising:
a vehicle;
a temperature sensor configured to provide an ambient air temperature output signal;
a pressure sensor configured to provide an air pressure output signal;
a humidity sensor configured to provide an air humidity output signal;
at least one proximity sensor configured to provide a proximity output signal including information about a size, distance to and relative velocity of at least one vehicle in proximity to the vehicle;

a wind sensor configured to provide a wind output signal including information about a velocity and direction of wind in proximity to the vehicle;

a road surface properties data source configured to provide road surface properties information;

a powertrain configured to power movement of the vehicle; and an engine control module configured to:
compute an air density ratio factor using the ambient air temperature output signal, the air pressure output signal, and the air humidity signal;

compute an aerodynamic drag ratio factor using the proximity output signal;

compute a rolling resistance ratio factor using the road surface properties information;

compute an effective velocity of the vehicle using the wind output signal;

combine at least one of the air density ratio factor, the aerodynamic drag ratio factor and the rolling resistance ratio factor with vehicle loss coefficients to determining new vehicle loss coefficients;

compute power loss of the vehicle using the new vehicle loss coefficients and the effective velocity of the vehicle in an equation $P_{eng\ out} - P_{Gravity} - P_{Accl} = P_{Aero} + P_{Whl\ Drag} + P_{loss}$;

wherein $P_{eng\ out}$ is the power loss due to the energy output, $P_{Gravity}$ is the power loss due to gravity calculated by the equation $P_{Gravity} = (m \cdot g \cdot \sin \theta) u$, $P_{Accl}$ is the power loss due to acceleration of the vehicle calculated by the equation $$P_{Accl} = (m \cdot a) u (I_{whl} \omega_{whl}) \omega_{whl} + (I_{FD} \omega_{FD}) \omega_{FD} + (I_{trans} \omega_{trans}) \omega_{trans} + (I_{eng} \omega_{eng}) \omega_{eng} = (m \cdot a) u + (M_{eqv} \cdot a) u,$$

$P_{Aero}$ is power loss due to aerodynamic drag calculated by the equation $$P_{Aero} = \left( \frac{A \cdot C_D \cdot \rho \cdot u^3}{2} \right),$$

$P_{Whl\ Drag}$ is power loss due to wheel drag calculated by the equation $P_{Whldrag} = C_{rr-dyn}(m \cdot g \cdot \cos \theta) u^2 + C_{rr-static}(m \cdot g \cdot \cos \theta) u$, and $P_{loss}$ is post-engine powertrain losses; and control the powertrain to improve fuel economy of the vehicle using the computed power loss.

16. The system of claim 15, wherein the road surface properties information includes information about road wetness.

17. The system of claim 15, wherein the engine control module is further configured to predict at least one of motion of the vehicle relative to another vehicle, roadway conditions or weather conditions.

18. The system of claim 15, wherein the engine control module is further configured to compute vehicle propulsion power by determining the sum of an aerodynamic drag variable, a wheel drag variable determined using a static rolling resistance variable, a dynamic rolling resistance variable, a road grade variable and the effective velocity, a gravity factor, and a post-engine powertrain loss factor.

19. The system of claim 18, wherein the engine control module computes vehicle propulsion power using received road terrain property information including information about road grade.

20. The system of claim 15, wherein the temperature sensor, the pressure sensor, the humidity sensor, the at least one proximity sensor and the wind sensor are mounted to the vehicle, and the road surface properties data source is communicatively coupled to the engine control module over a network.

* * * * *